(12) United States Patent
Godbole

(10) Patent No.: US 8,362,706 B1
(45) Date of Patent: Jan. 29, 2013

(54) CURRENT COMPENSATION SCHEME FOR LED CURRENT CONTROL

(75) Inventor: Kedar Godbole, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1022 days.

(21) Appl. No.: 12/339,942

(22) Filed: Dec. 19, 2008

(51) Int. Cl.
*H05B 37/02* (2006.01)

(52) U.S. Cl. ......................................... 315/291; 315/307

(58) Field of Classification Search .............. 315/209 R, 315/224–226, 244, 245, 291, 292, 307, 308
See application file for complete search history.

(56) References Cited

U.S. PATENT DOCUMENTS

| | | | |
|---|---|---|---|
| 6,016,038 A | 1/2000 | Mueller et al. | |
| 6,472,946 B2 | 10/2002 | Takagi | |
| 6,590,343 B2 * | 7/2003 | Pederson | 315/76 |
| 6,987,787 B1 | 1/2006 | Mick | |
| 7,843,146 B2 * | 11/2010 | Chang Chien et al. | 315/291 |
| 8,129,924 B2 * | 3/2012 | Van Ess et al. | 315/307 |
| 2008/0111503 A1 | 5/2008 | Ess et al. | |
| 2008/0224966 A1 * | 9/2008 | Cok et al. | 345/82 |

OTHER PUBLICATIONS

Ball, Alan, "A Novel Hysteretic Control Circuit," on Semiconductor, 11 pgs.
Barr, Michael, "Introduction to Pulse Width Modulation (PWM)," Jul. 2, 2003, http://www.oreillynet.com/pub/a/network/synd/2003/07/02/pwm.html, 4 pgs.

* cited by examiner

*Primary Examiner* — Jimmy Vu

(57) ABSTRACT

Disclosed herein is an apparatus and method to control a current through one or more Light Emitting Diode (LED) circuits, wherein a control command compensation unit generates a compensation function to offset errors in the LED circuit by modifying a temporal density modulation function.

19 Claims, 4 Drawing Sheets

CURRENT COMPENSATION SCHEME FOR LED CURRENT CONTROL

TECHNICAL FIELD

The present invention relates generally to electronic circuits and in particular to circuits for Light Emitting Diode (LED) current control.

BACKGROUND OF THE INVENTION

LED drivers control a variety of functional aspects of an LED including the flow of current through a LED or LED array. Many LED drivers control the flow of current using some form of a constant current control circuit.

FIG. 1 illustrates a number of square wave pulses associated with an implementation of a constant current control mechanism in an LED circuit for dimming one or more LEDs. The pulses are controlled by an active control element that is gated. A dimming signal 102 provides a desired or ideal effective value of the current. Dimming signal 102 tells the current controller how to control the "temporal density" of the LED current by providing a temporal density function to the controller. A temporal density function is used to modulate the density of current pulses over time by setting/defining current pulse parameters such as, the number, position, timing and/or repetition of pulses in a given time interval. Thus, the current flows in intervals and is ON for a portion of time and OFF for a portion of time during a particular interval according to the temporal density function. This produces a dimming effect upon the LED(s). In other words, the light output of the LED is broken up into pulses by the temporal density function. By controlling the ratio of the time this temporal density function is high (or "ON") to the time it is low ("OFF") the average output of the LED is controlled. Since the eye has a rather long time constant, with a proper selection of the frequency range for the components of the temporal density function, the eye perceives this light output to interpret an intensity level.

Errors introduced by the current control mechanisms of the LED circuit are not well controlled. For instance, errors occur when the current goes from an OFF state to an ON state because there is a ramp up time, corresponding to time interval 108, where the actual current 106 is less than the ideal current 104. Likewise, when the current goes from an ON state to an OFF state there is a ramp down time 110 where the actual current 106 exceeds the ideal current 104. The error associated with the ramping up time does not necessarily cancel out the error associated with the ramping down time. Thus, these errors produce an actual average current 114 that is different than the ideal average current 116 set by the dimming signal 102. These and other errors in the LED circuit cause distortions in the color and/or intensity of light emitted by the LED(s).

DETAILED DESCRIPTION

In the following detailed description, numerous specific details are set forth to provide a thorough understanding of claimed subject matter related to current control in an LED circuit. However, it will be understood by those skilled in the art that claimed subject matter may be practiced without these specific details. In other instances, well-known methods, procedures, and components have not been described in detail so as not to obscure claimed subject matter.

Disclosed herein is a method and device for controlling the current in an LED circuit to compensate the current pulse density to correct for temporal response delay effects or errors in the LED circuit using a feed forward and/or feedback compensation scheme. Temporal response delay effects or errors in an LED circuit are caused by circuit delays relating to ramping current to desired values, logic circuit delays, communication failures or delays and/or finite bandwidth effects for feedback loops. In one embodiment, a compensation function generator receives or looks-up, information about an LED fixture's output associated with a dimming command. The LED output may be measured, characterized and/or fed back to the compensation function generator. The compensation function generator generates a compensation function that adjusts a temporal density function to offset errors introduced by the LED circuit. The temporal density function controls the power source by modulating the current pulses (i.e., duty cycle), position, frequency and/or timing of current pulses in the circuit. The resulting average current is proportional to the temporal density (i.e., the current density over time) of the pulses gating the constant current controller.

There are a variety of methods of varying the temporal density of pulses in a current and claimed subject matter is not limited in this regard. For instance, one method of varying the temporal density of pulses in the current is by Pulse Width Modulation (PWM) which modulates a power source's duty cycle with a substantially fixed frequency. Another method of varying the temporal density is Delta-Sigma Modulation (DSM) which varies temporal density by performing higher level sigma-delta modulation of an underlying temporal density function. Another modulation scheme is Stochastic Signal Density Modulation (SSDM) which varies the temporal density by comparison of a threshold level with a random or pseudo random waveform.

Figure 1:
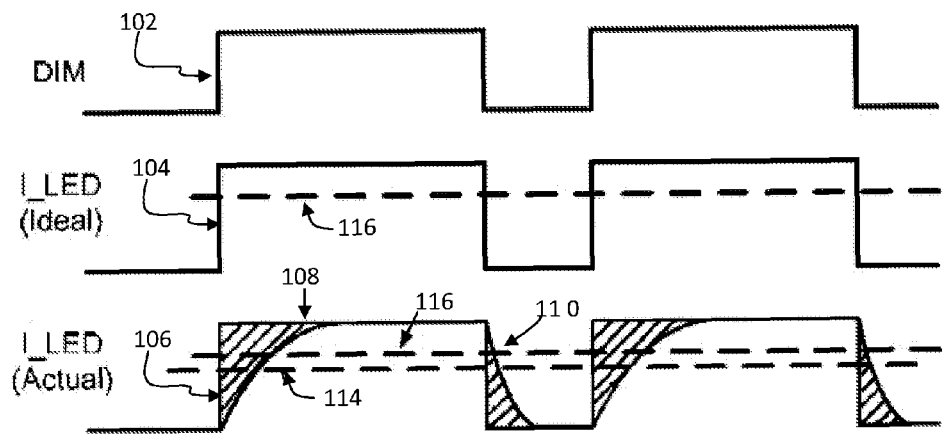
FIG. 1 illustrates current pulse timing of signals for embodiments of current control signals in LED circuits.
Figure 2:
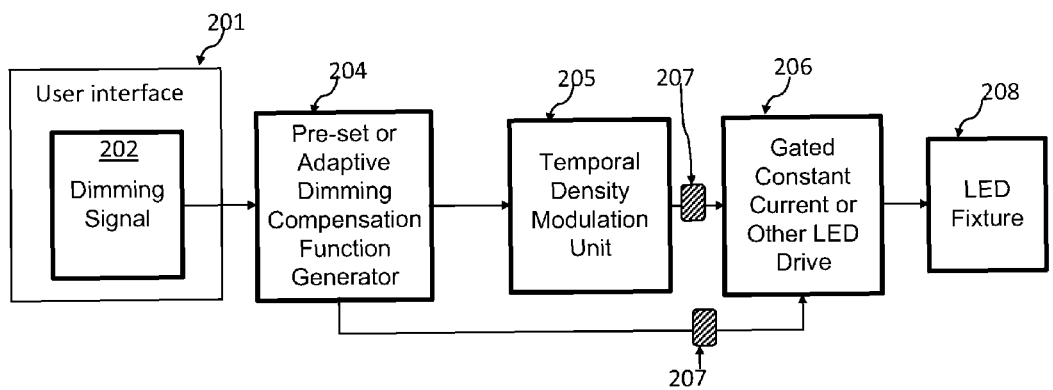
FIG. 2 is a block diagram illustrating a particular embodiment of a compensation scheme for current control in an LED circuit.

FIG. 2 is a block diagram illustrating a particular embodiment of a feed forward compensation scheme for current control in an LED circuit. Dimming signal 202 comprises one or more commands for adjusting the intensity and/or color of a single LED or an array of LEDs. Arrays of LEDs may comprise LEDs of various primary colors such as red, green and blue. The colored LEDs may be mixed in various ratios to achieve other desired colors.

In one embodiment, the dimming signal 202 indicates a desired or ideal LED intensity read as a time average of a temporal density for a given pulse stream. The pulse stream temporal density directly correlates to the perceived intensity of the light emitted from an LED. The dimming signal 202 may be input by a user at interface 201 and/or may be pre-set and controlled by a microprocessor, microcontroller or other circuit coupled to the LED circuit.

In the current embodiment, dimming signal 202 flows to a pre-determined and/or adaptive dimming compensation function generator 204. The dimming compensation function generator 204 produces a dimming compensation function to modify the dimming signal to compensate for temporal response delay errors in the LED circuit. As noted above, temporal response delay effects or errors in the LED circuit may be caused by circuit delays relating to ramping current to desired values, logic circuit delays, communication failures or delays and/or finite bandwidth effects for feedback loops. The compensation factor or function may be derived from a characterization of the output errors of the LED circuit associated with the dimming signal 202. The dimming compensation function changes the temporal density function of the dimming signal 202.

In one embodiment, the dimming compensation function generator 204 is a look-up table or list of pre-calculated compensation values correlated to the dimming signal 202. In another embodiment, the dimming compensation function may be an adaptive function. The dimming compensation function is applied to the dimming signal to produce a compensated dimming signal configured to compensate for errors in the LED circuit.

An adaptive dimming compensation function may respond to various factors such as time and temperature variations and/or circuit variations and claimed subject matter is not limited in this regard. For example, an adaptive compensation function generator may be responsive to measurements of an input voltage to a switch mode constant current driver and determine a compensation function to offset errors associated with the rise and/or fall time of the current.

In another embodiment, the dimming compensation function is derived using a pre-set values list or measured inputs, or combinations thereof. The pre-set and measured inputs include compensation factors related to errors introduced in the LED circuit due to the current control function and may include additional compensation factors to be used to derive the dimming compensation function. These additional factors may be pre-determined and/or measured. The additional compensation factors are used to mitigate a variety of errors that may be predicted or measured in an LED circuit other than the errors introduced due to the current control function. For instance, the pre-set or look-up table values may compensate for variables such as temperature, length of time the circuit has been functioning, frequency of changes to LED intensity and/or number of LEDs in an array affected by the dimming signal 202 and claimed subject matter is not limited in this regard.

In one embodiment the output of the dimming compensation function generator 204 is a dimming signal comprising a compensated temporal density function that will be used to modify the current to compensate for errors in LED circuit. In this embodiment, the compensated dimming signal 207 propagates directly to the gated constant current LED driver 206.

In an alternative embodiment, the output of the dimming compensation function generator 204 flows to a temporal density modulation unit 205 prior to propagating to the LED driver 206. At temporal density modulation unit 205, a temporal density modulation scheme is selected. The modulation scheme selection is based at least in part on the compensation function and/or is selected to optimize a compensation scheme for mitigating predicted and/or characterized errors in the LED circuit. The modulation scheme selection includes PWM, DSM and/or SSDM (as described in greater detail above). The output of the temporal density modulation unit is a compensated dimming signal 207.

The compensated dimming signal 207, whether propagating from the temporal density modulation unit or the compensation function generator, flows to LED driver 206. LED driver 206 adjusts the current being driven to the LED fixture 208 based on the compensated dimming signal 207. Thus, the LED driver 206 adjusts the intensity and/or color of the LEDs in LED fixture 208 based at least in part on the compensated dimming signal 207.

Figure 3:
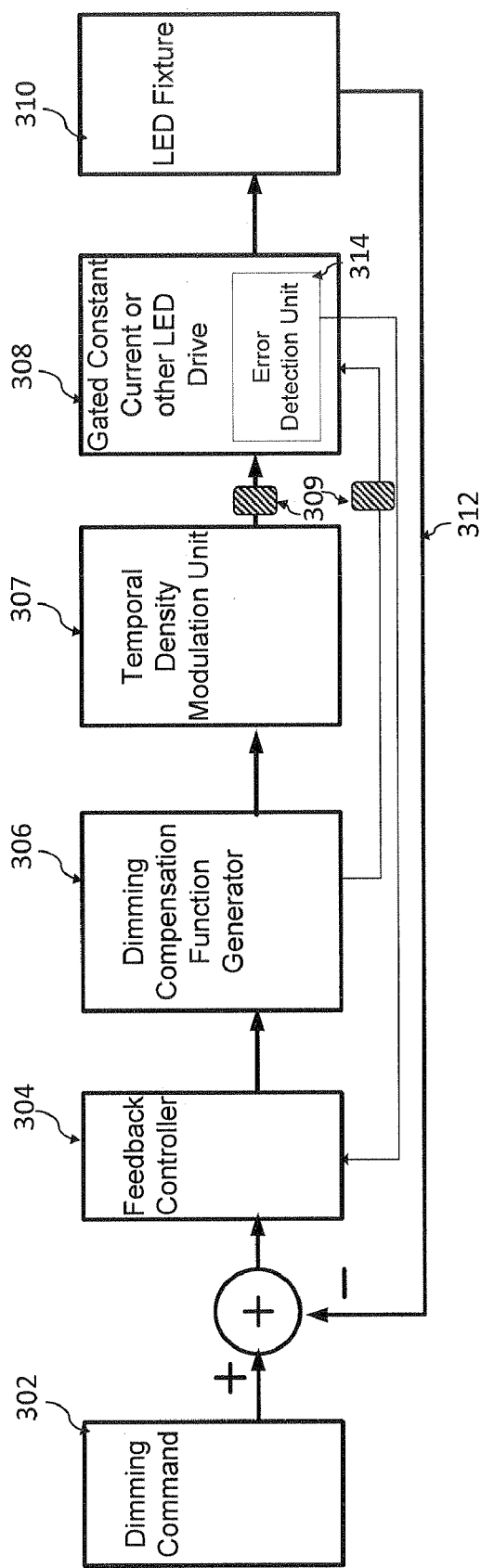
FIG. 3 is a block diagram illustrating a particular embodiment of a compensation scheme for current control in an LED circuit.

FIG. 3 is a block diagram illustrating a particular embodiment of a feedback compensation scheme for current control in an LED circuit. Dimming command 302 represents one or more command signals for communicating an adjustment of LED intensity to an LED driver 308. As discussed above, the adjustments are for changing the intensity and/or color of a single LED or an array of LEDs. The dimming command 302 indicates a desired or ideal LED intensity indicated as a percentage of current and/or average temporal density. The dimming command 302 includes a temporal density function for modulating the temporal density of current pulses propagating through an LED circuit and is communicated to feedback controller 304.

Feedback controller 304 may be a Proportional Integral Derivative controller (PID controller) or other controller known to those of skill in the art and claimed subject matter is not limited in this regard. Feedback controller 304 compares an output of the LED fixture circuit 312 to the dimming command 302 to compare the desired average current through LED fixture 310 and an actual current through LED fixture 310. This comparison information is communicated to a dimming compensation function generator 306.

In one embodiment, the feedback controller 304 receives feedback from specific portions of the circuit for the LED fixture 310. For instance, the current control portion of the LED circuit may be monitored to provide feedback specific to that portion of the circuit and to isolate the source of errors in the circuit. Additionally, an error detection unit 314 may provide this functionality as discussed in greater detail below.

The dimming command 302 comprises a temporal density function. The dimming compensation function generator 306 derives a dimming compensation function based at least in part on the measurement of the output of the LED circuit 312 or the error origin information received from the error detection unit 314, or combinations thereof. In one embodiment, in the dimming compensation function generator 306, the temporal density function of dimming command 302 is modified by the dimming compensation function. The dimming compensation function is applied to the dimming command 302 to produce an output comprising a compensated dimming command 309. The compensated dimming command 309 flows to the gated constant current LED driver 308.

In an alternative embodiment, the output of the dimming compensation function generator 306 is the original dimming command 302 and the dimming compensation function. Both outputs are communicated to the temporal density modulation unit 307 where a modulation scheme may be selected. In one embodiment, the modulation scheme selection may be based at least in part on the compensated dimming command and/or is selected to optimize a compensation scheme for mitigating the errors detected in the LED circuit. The modulation scheme selection may include PWM, DSM and/or SSDM. The output of the temporal density modulation unit 307 is the compensated dimming command 309.

The compensated dimming command 309 is received by the LED driver 308. In one embodiment, LED driver 308 controls the current flow to LED fixture 310 based on the compensated dimming command 309 by altering the temporal density modulation of the current pulse accordingly. LED driver 308 adjusts the current being driven to the LED fixture 310 to change the intensity and/or color of the light emitted from the LED fixture 310 and to closely approximate the ideal LED current as indicated in the dimming command 302.

In one embodiment, an error detection unit 314 is part of the LED driver 308 and is configured to detect the origin of a variety of errors in the LED circuit. For instance, error detection unit 314 is configured to detect that certain errors are attributable to the temporal response effects such as the ramp up and/or ramp down times when the current pulses ON or OFF. Or, error detection unit 314 determines that errors are occurring during a steady state or during OFF periods between pulses. Error detection unit 314 is further configured to feedback the error origin data to the feedback controller 304. Errors having different origins may be compensated for individually and/or cumulatively and claimed subject matter is not limited in this regard.

Figure 4:
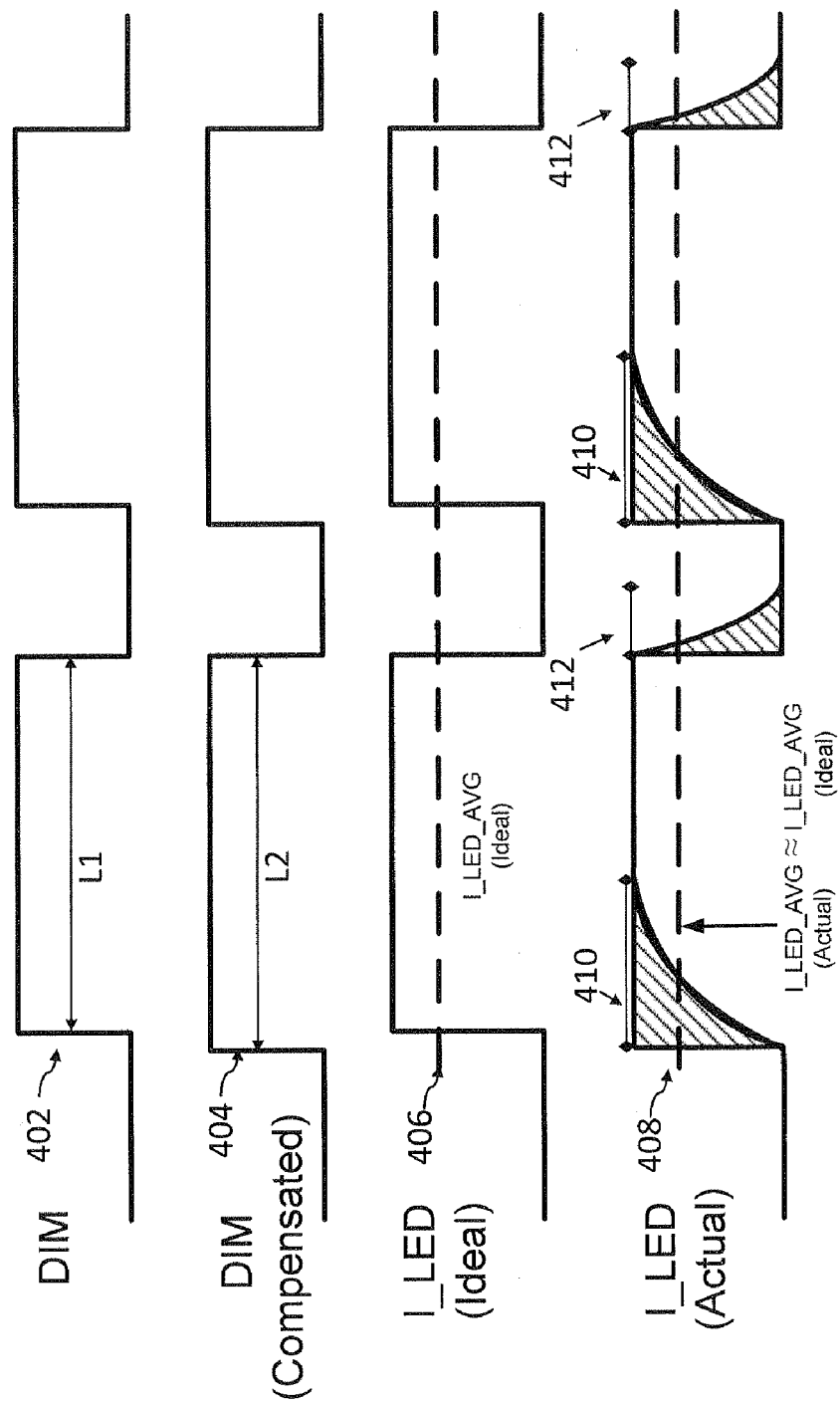
FIG. 4 illustrates current pulse timing of signals for embodiments of current control signals in LED circuits.

FIG. 4 illustrates a number of current pulse timing diagrams. In the diagram, a comparison of an ideal current 406 based on the un-compensated dimming signal 402 and an actual current 408 based on compensated dimming signal 404 illustrates that the actual LED current 408 is a close approximation to the ideal current 406 when based on the compensated dimming signal 406. In the current embodiment, a dimming compensation function as described with respect to FIG. 2 or 3 is used to compensate for errors in an LED circuit to generate the compensated dimming signal 404.

The timing diagram for the actual current 408 propagating through the LED circuit illustrates a ramp up time 410 and ramp down time 412 which cause errors in the average current through the LED circuit. The ramp up and ramp down times may not cancel each other out. In one embodiment, a compensated dimming function 404 modulates of the effective pulse length of the current to compensate for the errors. Thus, the actual current 408 closely approximates the ideal current 406. However, this is merely an example of modulating a current pulse parameter to change the temporal density function and claimed subject matter is not so limited. For instance, in another embodiment, one or more other parameters such as the number or timing of pulses over a particular time interval may be modulated to change the temporal density of the current.

In one embodiment, if the overall error is an increase in the average current through the LED circuit with respect to the desired current then the dimming compensation function would decrease the duration of the pulse. Or, as shown in FIG. 4, if the overall error is a decrease in the average current through the LED circuit with respect to the desired current then the dimming compensation function would increase the duration of the pulse. Thus, L2 will be greater than L1 and will result in an average current through the LED circuit substantially closer to the ideal current.

Figure 5:
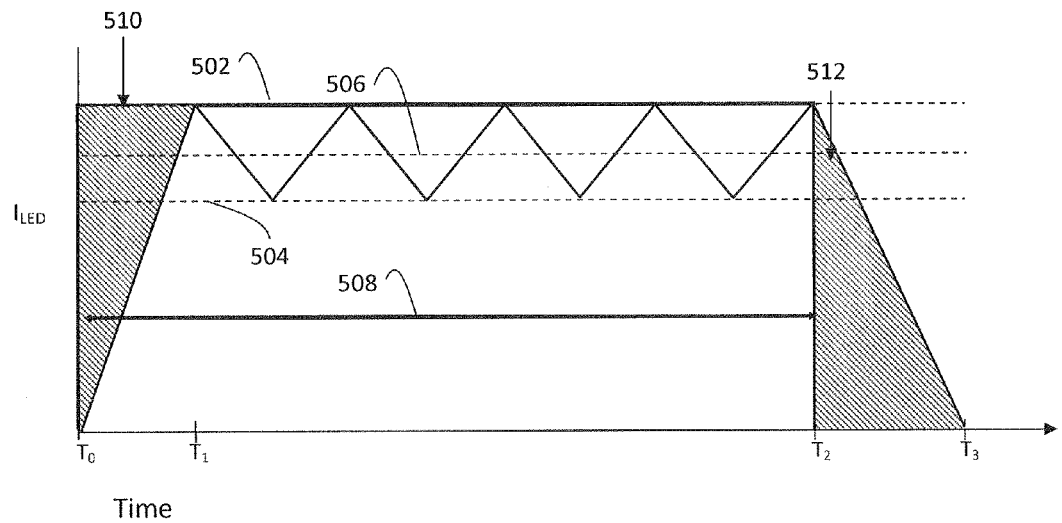
FIG. 5 illustrates an embodiment of a single pulse of a dimming signal for current control in an LED.

FIG. 5 is a graph illustrating an uncompensated current through an LED circuit ($I_{LED}$) over time. In one embodiment, an ideal current is selected. An uncompensated dimming function is generated. The uncompensated dimming function comprises a temporal density. A single current pulse 508 is illustrated in FIG. 5. For this example the pulse length is controlled to modulate the temporal density of the current. However, other ways to control the temporal density of a current include changing the number, position, timing and/or repetition of pulses in a given interval and claimed subject matter is not limited in this regard. Referring still to FIG. 5, the pulse length from $T_0$ to $T_2$ is determined by the uncompensated dimming function. After a ramping period, $I_{LED}$ is controlled by a gated controller such as a hysteretic controller. $I_{LED}$ ramps up between $T_0$ and $T_1$ and ramps down between $T_2$ and $T_3$. After the ramping up period 510, $I_{LED}$ is held in a steady state by the gated controller, such that as $L_{ED}$ oscillates between an upper current threshold 502 and a lower current threshold 504 a constant average current is delivered to the LED circuit during the pulse. However, during the ramping up period 510 from $T_0$ and $T_1$ there is less $I_{LED}$ during the pulse period than is required by the dimming function. Likewise, during the ramping down period 512 from $T_2$ and $T_3$ there is excess $I_{LED}$ because the ramp down period exceeds the pulse period. Thus, the $I_{LED}$ does not follow the dimming function exactly and does not provide an ideal $I_{LED}$.

In one embodiment, the differences between the actual $I_{LED}$ and the ideal $I_{LED}$ may be detected. For instance, differences in the average current from $T_0$ to $T_1$ and from $T_2$ to $T_3$ and the expected $I_{LED}$ from $T_0$ to $T_1$ and from $T_2$ to $T_3$ are isolable and/or detectable. These are ramping errors. Additionally, there may be errors occurring between $T_1$ and $T_2$ while the gated controller holds the current in a steady state. For instance, the average current 606 during the steady state may fall below an acceptable steady state current due to some errors in the gating mechanism of the gated controller. These errors may also be detected separately or may be detected cumulatively. A compensated dimming function is then generated based at least in part on these detected differences. The compensated dimming function alters the pulse density of $I_{LED}$ by modifying the temporal density function to account for the detected errors and to tune the pulse density in order to achieve a closer to ideal current through the LEDs.

Figure 6:
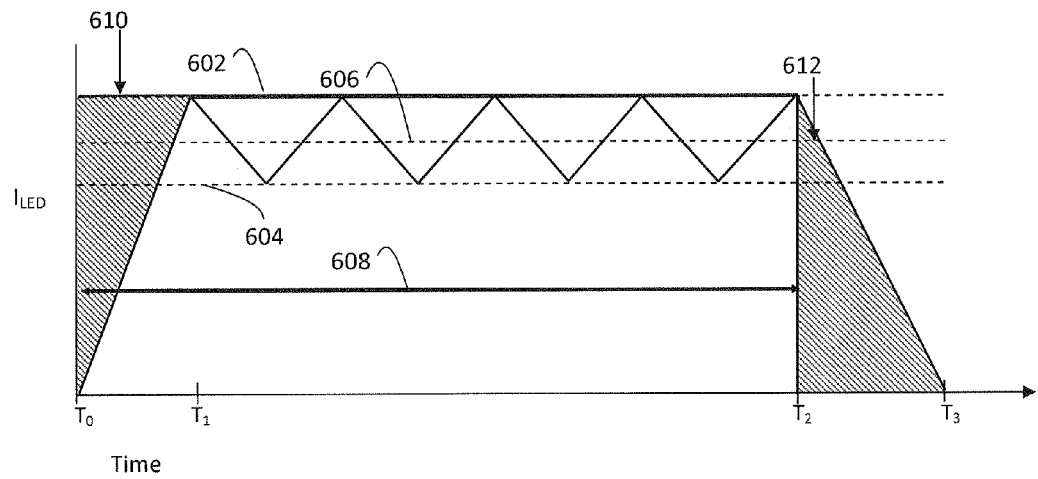
FIG. 6 illustrates an embodiment of a single pulse of a dimming signal for current control in an LED.

FIG. 6 shows a single pulse of a compensated dimming current having an extended pulse length 608 to compensate for errors detected in the average $I_{LED}$ with respect to the ideal $I_{LED}$. A single pulse 608 is illustrated. The pulse density is determined by the compensated dimming function and in this embodiment the length of pulse 608 is greater than the length of uncompensated pulse 508 (shown in FIG. 5). The length is only one parameter determining density, and is shown only for illustration. In an alternate embodiment, other parameters may be modified to alter the temporal density of a current and claimed subject matter is not so limited.

The ramping up period 610 and ramping down period 612 still exist, however, because the length of the pulse has changed, the errors caused by ramping up and down are mitigated by the compensated dimming function. Thus, between $T_0$ and $T_3$, the compensated average $I_{LED}$ is substantially closer to the ideal $I_{LED}$.

In another embodiment, the errors in the circuit may be pre-determined, thus the compensated dimming function may be applied without taking a measurement of the current. The pre-determined compensation factors may be stored in a memory in a look-up table, pre-defined adaptive function and/or list, or implemented by a suitable electronic circuit, either analog or digital, or a combination thereof. In yet another embodiment, both a pre-determined compensation function/factor and/or a measurement based compensation function may be applied to generate a finely tuned compensated dimming function and claimed subject matter is not limited in this regard.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

We claim:

1. An apparatus comprising:
    an interface configured to communicate one or more control commands for controlling a current supply to a Light Emitting Diode (LED) circuit, wherein the control commands define current pulse parameters via an associated temporal density function; and
    a compensation unit includes a look-up table populated with at least one compensation factor, wherein the compensation unit is configured to modify the current pulse parameters of the temporal density function associated with the control commands based on the compensation factor from the look-up table to compensate for errors associated with temporal response delay effects associated with the LED circuit.

2. The apparatus of claim 1 wherein the current pulse parameters include one or more of a modulation scheme, a current pulse length, current pulse timing, current pulse position, or pulse density.

3. The apparatus of claim 1 further comprising:
    a feedback controller configured to compare the control commands to an LED circuit output to detect errors in the current pulse parameters; and
    a gated constant current controller configured to receive a modified control command and to execute the modified control command to change the current pulse parameters according to the modified temporal density function.

4. The apparatus of claim 3 further comprising an error detection unit to detect a source of LED circuit output errors.

5. The apparatus of claim 4 wherein the error detection unit is configured to determine that the error source includes one or more of a current pulse ramping up period and a current pulse ramping down period.

6. The apparatus of claim 4 wherein the error detection unit is configured to determine that an error in the LED circuit output occurs during a gated steady state period.

7. The apparatus of claim 3 wherein the feedback controller is a Proportional Integral Derivative controller.

8. The apparatus of claim 3 wherein the gated constant current controller is a hysteretic controller.

9. The apparatus of claim 1 further comprising a gated controller configured to receive a modified control command and to execute the modified control command to change the current pulse parameters according to the modified temporal density function.

10. The apparatus of claim 1, further comprising a temporal density modulation unit configured to select a temporal density modulation scheme to optimize the modification of the control commands.

11. The apparatus of claim 10 wherein the modulation scheme includes one or more of Pulse Width Modulation (PWM), Delta-Sigma Modulation and Stochastic Signal Density Modulation (SSDM).

12. The apparatus of claim 1 wherein the compensation unit is further configured to modify the temporal density function to compensate for factors causing errors in the LED circuit that are independent of temporal response delay effects.

13. The apparatus of claim 1 wherein the compensation unit further comprises one or more pre-set compensation functions for determining the compensation factor for modifying the control commands.

14. A method comprising:
    receiving a control command configured to control a current through a Light Emitting Diode (LED) circuit;
    accessing a look-up table to determine a temporal response error associated with the LED circuit; and
    compensating for the temporal response error associated with the LED circuit by modifying the control command to alter a temporal density function to offset the temporal response error in the LED circuit.

15. The method of claim 14 wherein compensating for the temporal response error associated with the LED circuit further comprises changing current pulse modulation parameters associated with the temporal density function, the current pulse modulation parameters comprising one or more of a current pulse modulation scheme, pulse length, pulse timing, pulse positioning, or pulse repetition.

16. The method of claim 14 wherein the look-up table is configured to include predetermined errors accessible based in part on the control command, a measurement of variables associated with errors in the LED circuit, or a comparison of the control command to an output of the LED circuit to detect errors in the current.

17. An apparatus comprising:
    means for receiving a control command configured to control a current supply to a Light Emitting Diode (LED) circuit;
    means for looking-up a compensation factor associated with the LED circuit in a table; and
    means for modifying the control command to compensate for temporal response effects in the LED circuit based, at least in part, on the compensation factor.

18. The apparatus of claim 17 wherein the control command is configured to define current pulse parameters for the current supply, wherein the current pulse parameters include a modulation scheme, a current pulse length, current pulse timing, current pulse position, or pulse density.

19. The apparatus of claim 17 further comprising means for comparing the control command to an output of the LED circuit to detect the temporal response effects in the current.

* * * * *